(12) United States Patent
Saini

(10) Patent No.: US 11,673,177 B2
(45) Date of Patent: Jun. 13, 2023

(54) 3D-PRINTED CONFORMAL COOLING FOR HOT STAMPING CASTED DIE INSERTS

(71) Applicant: FORD MOTOR COMPANY, Dearborn, MI (US)

(72) Inventor: Varinder Singh Saini, Toronto (CA)

(73) Assignee: Ford Motor Company, Dearborn, MI (US)

( * ) Notice: Subject to any disclaimer, the term of this patent is extended or adjusted under 35 U.S.C. 154(b) by 391 days.

(21) Appl. No.: 16/812,847

(22) Filed: Mar. 9, 2020

(65) Prior Publication Data

US 2020/0206797 A1 Jul. 2, 2020

Related U.S. Application Data

(62) Division of application No. 15/467,607, filed on Mar. 23, 2017, now Pat. No. 10,610,917.

(51) Int. Cl.

| B22C 9/02 | (2006.01) |
|---|---|
| B28B 1/00 | (2006.01) |
| B21D 22/02 | (2006.01) |
| B21D 37/16 | (2006.01) |
| B33Y 10/00 | (2015.01) |
| B33Y 80/00 | (2015.01) |
| B21D 37/01 | (2006.01) |

(52) U.S. Cl.
CPC ........... B21D 22/022 (2013.01); B21D 37/16 (2013.01); B22C 9/02 (2013.01); B28B 1/001 (2013.01); B33Y 10/00 (2014.12); B33Y 80/00 (2014.12); *B21D 37/01* (2013.01)

(58) Field of Classification Search
CPC .. B22C 9/02; B28B 1/00; B28B 1/001; B21D 22/02; B21D 22/022; B21D 37/01; B21D 37/16

USPC .............................. 164/6, 15; 72/342.3
See application file for complete search history.

(56) References Cited

U.S. PATENT DOCUMENTS

| 5,976,457 A | 11/1999 | Amaya et al. |
|---|---|---|
| 7,261,550 B2 | 8/2007 | Herzog |
| 8,137,607 B2 | 3/2012 | Kloeb et al. |
| 9,089,999 B2 | 7/2015 | Dean |
| 10,610,917 B2 * | 4/2020 | Saini ................. B28B 1/001 |

(Continued)

FOREIGN PATENT DOCUMENTS

| CN | 1468155 A | 1/2004 |
|---|---|---|
| CN | 101242923 A | 8/2008 |

(Continued)

OTHER PUBLICATIONS

Machine translation of CN 106694804 A (Year: 2017).*

(Continued)

*Primary Examiner* — Kevin P Kerns
(74) *Attorney, Agent, or Firm* — Vincent Mastrogiacomo; Brooks Kushman P.C.

(57) ABSTRACT

A mold assembly for a hot stamping die is provided. The mold assembly includes a mold having a body defining a cavity and a removable channel insert. The removable channel insert is positioned in the cavity and has a curved shape. The removable channel insert also includes a plurality of projections integrating the insert with the body. The removable channel insert is configured to form inlets and outlets for fluid in the hot stamping die upon removal of the insert.

9 Claims, 4 Drawing Sheets

(56) References Cited

U.S. PATENT DOCUMENTS

| | | | |
|---|---|---|---|
| 2001/0008182 A1* | 7/2001 | Sugita et al. | B22C 9/06 |
| | | | 164/112 |
| 2004/0007044 A1 | 1/2004 | Merle et al. | |
| 2007/0056815 A1* | 3/2007 | Hanna et al. | F16D 65/127 |
| | | | 188/218 XL |
| 2009/0260773 A1 | 10/2009 | Yoshii et al. | |
| 2009/0320547 A1 | 12/2009 | Horton et al. | |
| 2012/0308781 A1 | 12/2012 | Abe et al. | |
| 2013/0111965 A1 | 5/2013 | Lee | |
| 2013/0221192 A1 | 8/2013 | Rocco et al. | |
| 2014/0021653 A1 | 1/2014 | Nemazi et al. | |
| 2015/0086408 A1 | 3/2015 | Kottilingam et al. | |
| 2016/0030993 A1 | 2/2016 | Lee | |
| 2018/0236532 A1 | 8/2018 | Forsmark et al. | |
| 2018/0369904 A1 | 12/2018 | Adams et al. | |

FOREIGN PATENT DOCUMENTS

| | | | | |
|---|---|---|---|---|
| CN | 103084474 | A | 5/2013 | |
| CN | 103143627 | A | 6/2013 | |
| CN | 203484866 | U | 3/2014 | |
| CN | 104001914 | A | 8/2014 | |
| CN | 104511725 | A | 4/2015 | |
| CN | 106180392 | A * | 12/2016 | ............. B21D 37/02 |
| CN | 106694804 | A * | 5/2017 | ............. B22C 9/04 |
| CN | 108698121 | A | 10/2018 | |
| DE | 19856783 | C1 | 6/2000 | |
| DE | 10051893 | C2 | 6/2001 | |
| DE | 102007032621 | B4 | 8/2012 | |
| DE | 102013002097 | A1 | 8/2014 | |
| JP | 2005219384 | A | 8/2005 | |
| KR | 20090018445 | A | 2/2009 | |
| KR | 101149945 | B1 | 5/2012 | |
| WO | 2015085399 | A1 | 6/2015 | |

OTHER PUBLICATIONS

Machine translation of CN 106180392 A (Year: 2016).*
Chinese Office Action dated Nov. 2, 2020 (and English Translation of the Cover Page) for Chinese Appn. No. 201810240897.3, 12 pgs.
3D printer and 3D printing news (<<http://www.3ders.org/articles/20161017-schuler-introduces-3d-printed-hot-stamping-dies-for-more-efficient-cooling.html>>), retrieved Mar. 10, 2017, 8 pgs.

* cited by examiner

3D-PRINTED CONFORMAL COOLING FOR HOT STAMPING CASTED DIE INSERTS

CROSS-REFERENCE TO RELATED APPLICATIONS

This application is a division of U.S. application Ser. No. 15/467,607 filed Mar. 23, 2017, now U.S. Pat. No. 10,610,917 issued Apr. 7, 2020, the disclosure of which is hereby incorporated in its entirety by reference.

TECHNICAL FIELD

The present disclosure relates to the cooling of dies using conformal channels.

BACKGROUND

Hot stamping is a metal forming process that may include heating an article or component to be formed and then stamping the article while it is still at an elevated temperature. For example, when hot stamping a steel article, the article may be heated to a temperature at which the microstructure of the steel is converted to austenite (e.g., austenitizing). This temperature may be around 900-950° C., depending on the composition of the steel.

In some hot stamping processes, the dies of the stamping mold that provide the desired shape to the stamped article may be cooled. The cooled dies may cool the article as it is being stamped. If the cooling rate of the dies is sufficiently high, the microstructure of the stamped article may be converted to a high strength phase. In the case of steel components, a sufficient cooling rate may result in a martensitic microstructure. Hot stamping may also be used to form articles made from other metals, such as aluminum. For example, aluminum alloys may be solution heat treated and quenched using a hot stamping process.

The dies for the hot stamping process may be cooled by cooling channels formed in the dies using mechanical processes such as gun drilling. Gun drilled cooling channels may reduce the ability to control cooling rates in various areas of the die and may limit the heat transfer surface area available for cooling in the die. These limitations may reduce the ability to impart microstructure variations in the hot stamped article.

SUMMARY

According to an embodiment, a mold assembly for a hot stamping die is disclosed. The mold assembly includes a mold having a body defining a cavity and a removable channel insert. The removable channel insert is positioned in the cavity and has a curved shape with a plurality of projections. The plurality of projections integrate the insert with the body and are configured to form inlets and outlets for fluid in the hot stamping die upon removal of the insert.

In one or more embodiments, the body may include an upper mold and a lower mold configured to connect with a curved surface profile corresponding to the curved shape of the channel insert. The lower mold, upper mold, or both may include a forming surface defining recesses for receiving the plurality of projections to integrate the insert with the body. The lower mold and upper mold may cooperate to form the recesses along the curved surface profile for positioning the insert. The channel insert may be a removable material for forming channels having the curved shape of the insert in the die. The channel insert may be comprised of layered printed sand. The mold may be comprised of a layered printed sand. The channel insert may include surface features to form fluid flow regions in channels in the die.

According to an embodiment, a method of forming a hot stamping die mold is disclosed. The method includes positioning a lower mold having an upper surface with a curved surface profile and recesses, placing a channel insert having a shape corresponding to the curved surface profile and projections on the upper surface, and positioning an upper mold having a lower surface with a curved surface profile corresponding to the curved surface profile of the lower mold on the lower mold and the insert.

In one or more embodiments, the placing step may include positioning the projections in the recesses. The method may further include 3D printing the lower mold and upper mold. The method may further include 3D printing the insert from sand to the shape corresponding to the surface profile. The method may further include, forming an opening in the upper mold for receiving bulk material. The method may further include printing surface features on the channel insert for forming fluid flow regions in channels.

According to an embodiment, a die mold is disclosed. The die mold includes a lower mold, a channel insert, and an upper mold. The lower mold includes an upper surface defining recesses and having a curved surface profile. The channel insert is positionable on and has a shape corresponding to the upper surface of the lower mold. The channel insert includes projections corresponding to the recesses in the upper surface. The upper mold includes a lower surface having a curved surface profile corresponding to the curved surface profile of the lower mold.

In one or more embodiments, the channel insert may include a surface features to form fluid flow regions in channels in the die. The upper mold may define an opening for receiving bulk material. The channel insert may be removable for forming channels in the die. The upper mold may define at least one recess on the lower surface for receiving the channel insert. The channel insert may be comprised of a printed sand material.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In an embodiment, the present disclosure describes a process and a tool for forming a hot stamping die for forming a vehicle component.

Figure 1:
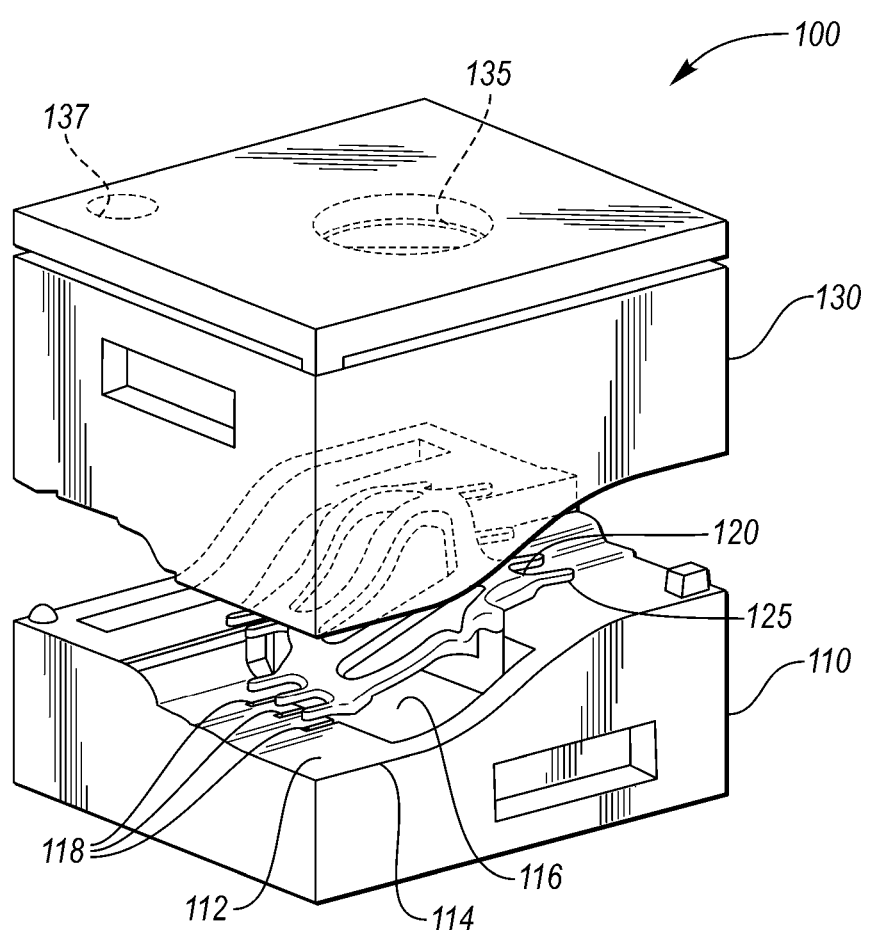
FIG. 1 is a perspective view of an exemplary hot stamping die mold according to an embodiment.
Figure 2:
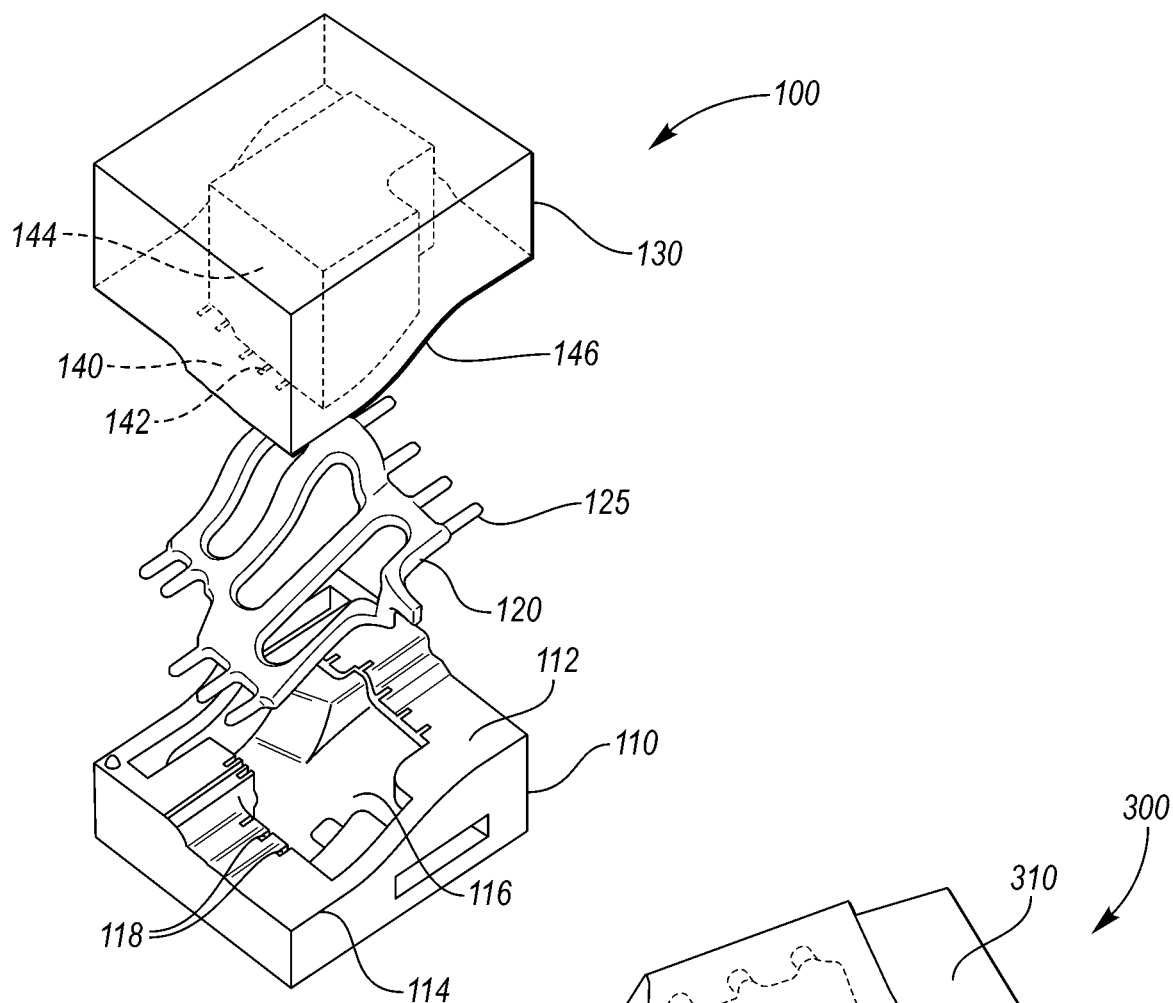
FIG. 2 is an exploded view of the exemplary hot stamping die of FIG. 1.

FIGS. 1 and 2 illustrate a mold assembly 100, or die mold, for forming a casted hot stamping die with conformal channels. The mold assembly 100 includes a lower mold 110 including an upper surface 112, or upper forming surface. The lower mold 110 of the mold assembly 100 also includes a mold cavity 116 defined by the upper surface 112 for forming the hot stamping die. The lower mold 110 has an edge, or parting line, referred to hereinafter as curved surface profile 114. Mold assembly 100 also includes an upper mold 130, with riser opening 135, and pour opening 137. The shape and position of openings 135, 137 are shown for illustrative purposes, and may be in other positions in the upper mold 130 and/or be different shapes.

As shown in FIG. 2, the upper mold 130 has a surface 140 with a cavity 144 for cooperating with the lower mold 110 for forming the hot stamping die for a particular part shape. The upper mold has a curved surface profile 146 corresponding to the curved surface profile 114 of the lower mold 110. As the two surface profiles interact to close the mold assembly, the parting line or curved surface profile used hereinafter refers to either the lower or upper molds. The lower mold 110 and upper mold 130 may be 3D printed to form unique curved surface profiles 114. The molds may be 3D printed from a material capable of forming the die. The lower mold 110 and upper mold 130 may be 3D printed from a sand material capable of maintaining the integrity of the mold during the molding process of the hot stamping die. The process of 3D printing using metal and sand material is described in U.S. Pat. No. 8,137,607 and U.S. patent application Ser. No. 15/435,726, which are hereby incorporated by reference.

Referring again to FIGS. 1 and 2, mold assembly 100 further includes a channel insert 120, or insert, to form channels in the hot stamping die. Channel insert 120 includes projections 125. Projections 125 provide positioning stability for the channel insert 120 in the mold assembly 100, and also form inlets and outlets for the channels in the molded die. Upper surface 112 of lower mold 110 includes recesses 118 defined in the upper surface. Recesses 118 provide positioning and retention for the channel insert 120 by corresponding to the projections 125 of the channel insert 120. Upper mold 130 may also include at least one recess 142 for receiving the projections 125 of channel insert 120. The positioning of the projections 125 is based on the shape of the channel insert 120 which corresponds to the curved surface profile of the mold assembly 100. The projections 125 may project toward any face of the die mold based on the die architecture, which is part specific, for the desired inlets and outlets for the channels.

According to an embodiment, the channel insert 120 has a conformal shape to the parting line curved surface profile 114 of the lower mold 110 (or the curved surface profile 146 of the upper mold 130). The conformed and adaptable shape of channel insert 120 is directly driven by the desired temperature of the working surface of the die for the particular hot stamped piece. Using the strength requirements needed at different locations on the hot stamped piece (e.g., a vehicle component), desired conditions are determined based on the hot stamping temperature of the piece at various parts of the working surface. The channels formed in the die may be for coolant or warming fluid based on the desired temperatures. Although cooling channels are disclosed hereinafter, the channels of the present disclosure may alternatively be warming fluid channels. As such, the use of cooling channels is for illustrative purposes. The channel insert 120 shape is determined based on the desired conditions. The shape needed to meet the desired conditions includes the shape of the channels as well as the distance of the channels from the surface of the molded die. The conformal shape may be selected to achieve the optimal cooling per cooling rates from the channels, for example, by varying the distance of the channels from the cooling surface, or varying the cross section of the cooling channels.

Based on the channel insert shape 120, the lower and upper molds curved surface profile is determined such that the channel insert can be positioned in the mold to form the die with the positioned channel insert. The flexibility in forming the lower mold 110 and upper mold 130 provides the ability to form conformal channels in the hot stamping die using the channel insert based on the desired temperatures of the working surface. The curved surface profiles 114, 146, recesses 118, 142 and channel insert 120 cooperate in the cavity of the mold die to form a mold assembly for a die with cooling channels positioned to provide cooling at desired cooling rates and at selected heat transfer areas. The channel insert 120 may have a variety of shapes and cross sections to form various channels in the die as desired. An example of channel insert 120 shown in FIG. 1 produces channels with widths and cross-sectional shapes as in FIG. 3, but in other examples, the channel insert may form channels with widths and cross-sectional shapes as in FIGS. 4A-B.

According to one or more embodiments, the channel insert 120 is 3D printed into the desired conformal shape based on the desired cooling/warming in the resulting molded die. The parting line, or curved surface profile, formed between the lower mold and upper mold is dependent on the conformal channel insert having the desired shape for channels in the hot stamping die. Based on the location and amount of cooling/warming needed in the die, the channel insert is 3D printed in the requisite shape to achieve the desired cooling when the stamping die is used. Upper and lower molds are printed accordingly to form the cavity for the die with the precise curved surface profile and recesses for receiving the channel insert 120.

In one or more embodiments, the channel insert 120 may be 3D printed from a lost core type material, such as sand. In an embodiment, the channel insert 120 may be 3D printed from high quality silica/zircon sand. When the insert 120 is placed in the mold assembly 100, bulk material surrounds or encapsulates the insert 120 such that it covers the surfaces of the insert 120. The lost core material may be 3D printed salt, glass, foam, or other 3D printable lost core material as appropriate. The material is such that it is used to form the channels while maintain the integrity during the molding process of the hot stamping die.

In one or more embodiments, the surface of the channel insert 120 may include surface features, such as a textured surface, in order to control fluid dynamics in the resultant cooling channels in the hot stamping die. In some embodiments, only a portion of the surface of the channel insert 120 includes the surface features or is textured. The surface features of the channel insert 120 may include any texture, stoppers, pockets, indents, walls, ridges, or other formations affecting fluid flow in the die to provide tailored flow regions to form a stamped part. The surface features may induce turbulent flow in sections of the cooling channels to improve cooling rates for the hot stamping die.

Figure 3:
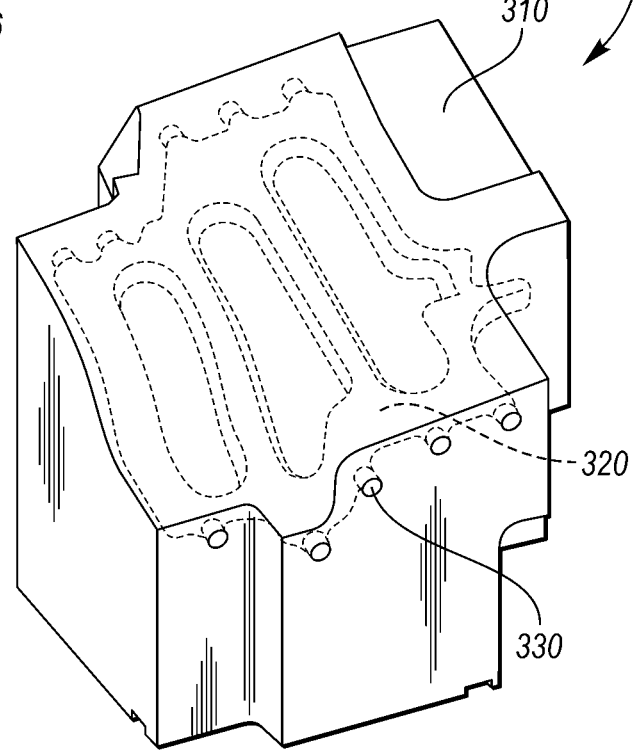
FIG. 3 is a perspective view of an exemplary molded hot stamping die according to an embodiment.
Figure 4A:
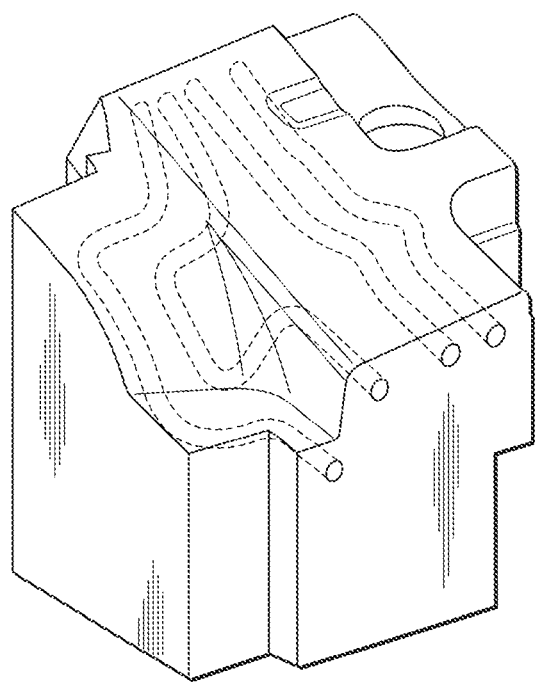
FIGS. 4A and 4B are perspective views of exemplary molded hot stamping dies according to other embodiments.
Figure 4B:
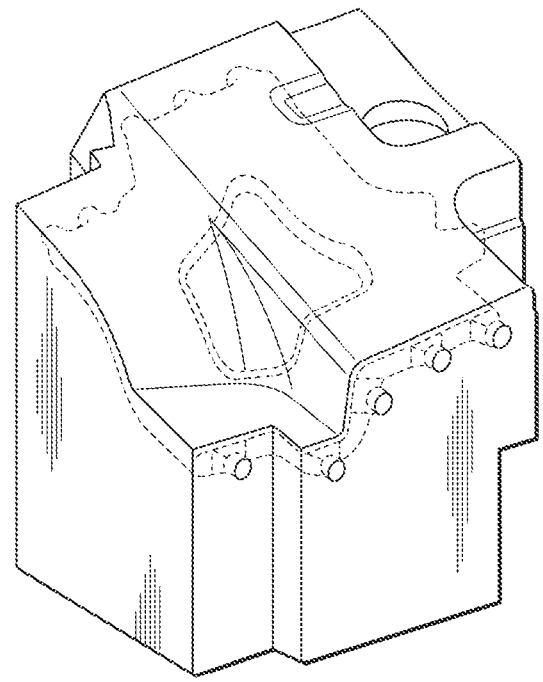

FIG. 3 shows an exemplary molded hot stamping die 300 according to an embodiment. Bulk material 310 forms the die with a forming surface for hot stamping the desired part.

The bulk material may be any material used for hot stamping dies, such as, for example, steel. Steel may include any casted steel material, such as castable tool steel material characterized by heat coefficients, conductivity, and hardness. Tool steel may be carbon or an alloy steel. The channel insert, upon removal, forms channels 320 in the die. The channels 320 formed are specific to the stamped part (with desired microstructure regions) formed by this die because of the conformal shape of the channel insert. The projections on the channel insert form the openings 330 based on the curved profile of the upper surface, as shown in FIGS. 1 and 2 for illustrative purposes. The openings 330 provide an inlet and outlet for cooling or warming fluid, and may be formed in other locations based on the shape of the channel insert and the depth of the recesses in the upper surface. The openings 330 may be positioned to correspond to and connect a channel of another hot stamping die, therefore reducing leakage between die channels.

Figure 5A:
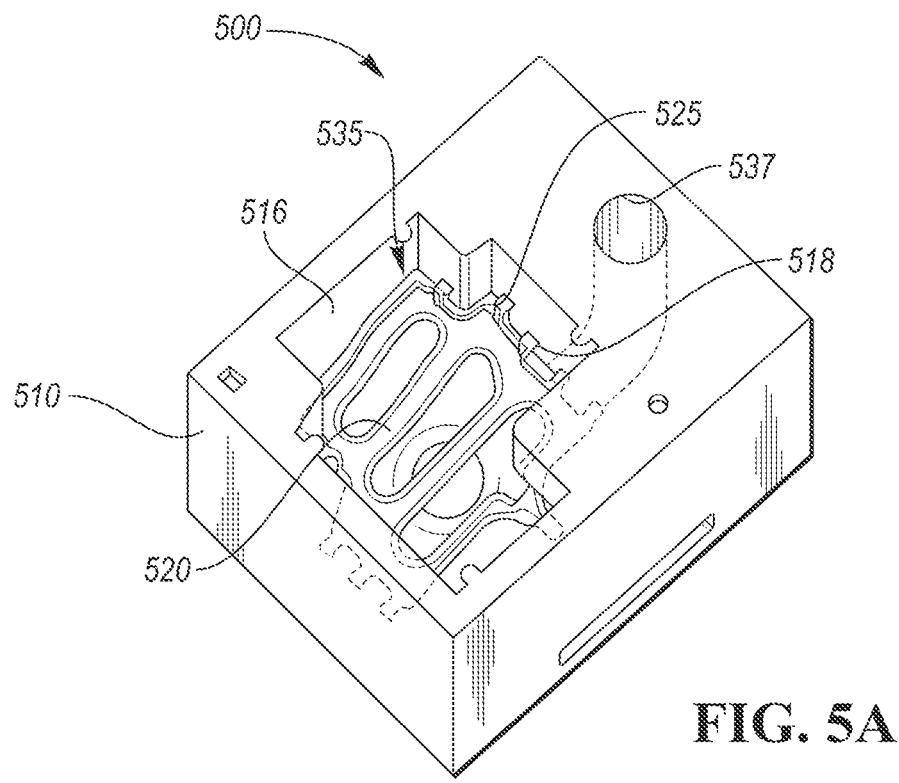
FIGS. 5A and 5B are perspective views of an exemplary hot stamping die mold according to another embodiment.
Figure 5B:
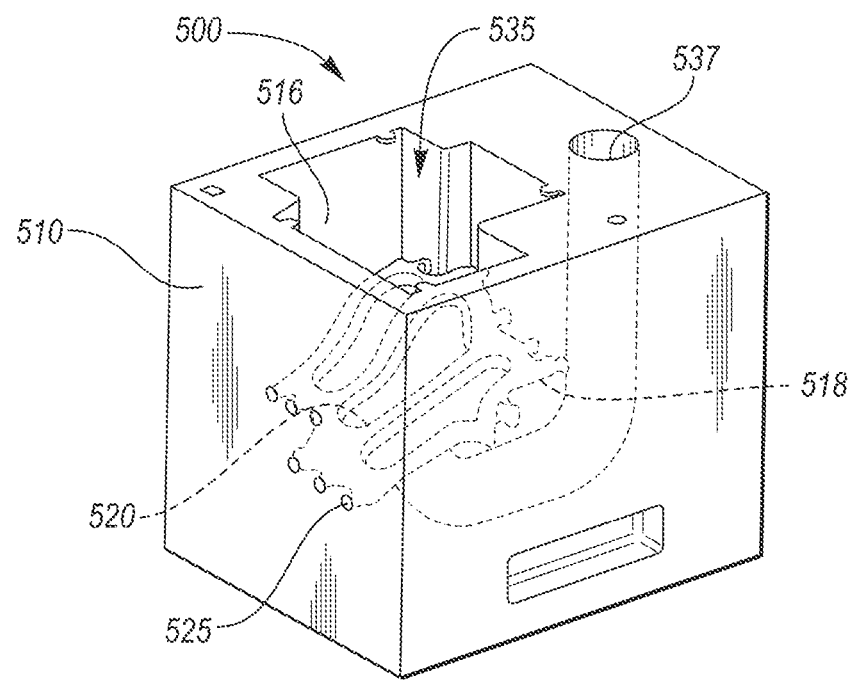

FIGS. 5A and 5B show an exemplary mold assembly 500, or die mold, according to another embodiment. The mold assembly 500 includes mold body 510 having a mold cavity 516 for receiving the bulk material. The mold body 510 may also include openings 535 and 537 which may cooperate with a riser opening or pour opening in a mold top (not shown). The shape and position of openings 535, 537 are shown for illustrative purposes, and may be in other positions in the mold body 510. The mold body 510 may be 3D printed from a material capable of forming the die, as disclosed above. The mold assembly 500 further includes a channel insert 520, or insert, to form channels in the hot stamping die. The channel insert 520 is removable after casting the die, and may be layered printed sand. The channel insert 520 is integrated with the mold body 510 at the integration points 518 via projections 525. The projections 525 correspond to the integration points 518 for removably connecting the channel insert 520 to the mold body 510. Projections 525 form inlets and outlets for the channels in the molded die. The inlets and outlets may be formed by the integration points 518 being a recess in the mold body 510, corresponding to the projections 525 for forming the integrated mold assembly 500. The projections 525 may project toward any face of the die mold based on the die architecture, which is part specific, for the desired inlets and outlets for the channels. In one or more embodiments, the surface of the channel insert 520 may include surface features as disclosed above.

The hot stamping die mold of the present disclosure provides channels for cooling or warming in the die to produce hot stamped parts with better, and more specific, structure and strength. The hot stamping die mold of the present disclosure also gives design flexibility to control the channel shape to increase the heat transfer area and cooling rate without adding production difficulties. By 3D printing the channels and die from sand, the channels can be formed to provide efficient and uniform cooling. For example, the resultant die from a mold assembly of the present disclosure allows for channels up to 3 mm from the working surface (or part surface) without compromising the structural integrity of the die during machining the top surface. As a result, part-specific channels and configurations can be formed and ideally positioned within a die mold to form a hot stamping die with improved cooling/warming.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of forming a hot stamping die mold comprising:
    positioning a lower mold defining a first cavity therein, and having an upper surface with a curved surface profile and defining recesses in the upper surface;
    providing a channel insert having an insert body with insert projections extending from the insert body, the insert projections corresponding to the recesses in the upper surface, and the channel insert having a shape corresponding to the curved surface profile;
    placing the insert projections within the recesses in the upper surface to position the channel insert on the lower mold; and
    positioning an upper mold defining a second cavity therein, having a lower surface with a curved surface profile corresponding to the profile of the lower mold on the lower mold and the insert to form a mold assembly,
    wherein the first cavity and the second cavity cooperate to define an interior cavity of the mold assembly, the interior cavity sized to receive bulk material around the channel insert and form a hot stamping die with channels formed by the channel insert, and the insert body is supported within the interior cavity by the insert projections being placed in the recesses such that the channel insert is supported on the upper surface at the insert projections.

2. The method of claim 1, wherein the insert projections are placed in the recesses such that the channel insert extends through the interior cavity according to the shape.

3. The method of claim 1, further comprising 3D printing the lower mold and the upper mold.

4. The method of claim 1, further comprising 3D printing the insert from sand to the shape corresponding to the surface profile to form a removable insert.

5. The method of claim 1, further comprising forming an opening in the upper mold for receiving bulk material, the opening being fluidly connected to the interior cavity.

6. The method of claim 1, further comprising printing surface features on the channel insert for forming fluid flow regions in channels.

7. The method of claim 1, wherein the insert projections correspond to inlets and outlets for the channels.

8. A method of forming a hot stamping die mold comprising:
    positioning a lower mold having an upper surface with a curved surface profile and defining recesses;
    placing a 3D printed channel insert having an insert body with insert projections extending therefrom, the channel insert having a shape corresponding to the curved surface profile of the lower mold on the upper surface such that each insert projection is positioned in a corresponding recess of the recesses in the lower mold and the 3D printed channel insert is supported on the lower mold at the insert projections, the 3D printed channel insert further defining surface features thereon for forming fluid flow regions in channels; and
    positioning an upper mold having a lower surface with a curved surface profile corresponding to the profile of the lower mold on the lower mold and the insert.

9. A method of forming a hot stamping die comprising:
positioning a lower mold defining a first cavity therein, and having an upper surface with a curved surface profile and defining recesses;
providing a channel insert having insert projections extending from an insert body, and a shape corresponding to the curved surface profile of the lower mold, the channel insert comprising a lost core material;
placing the insert projections in the recesses in the upper surface to position the channel insert on the upper surface of the lower mold such that the channel insert is supported on the lower mold only by the insert projections;
positioning an upper mold on the lower mold and the insert to form a mold assembly, the upper mold defining a second cavity therein, and having a lower surface with a curved surface profile corresponding to the upper surface of the lower mold, and the first cavity and the second cavity cooperating to form an interior cavity;
introducing bulk material into the interior cavity of the mold assembly around the channel insert to mold a hot stamping die; and
removing the lost core material of the channel insert to form channels in the hot stamping die.

* * * * *